Patented June 20, 1939

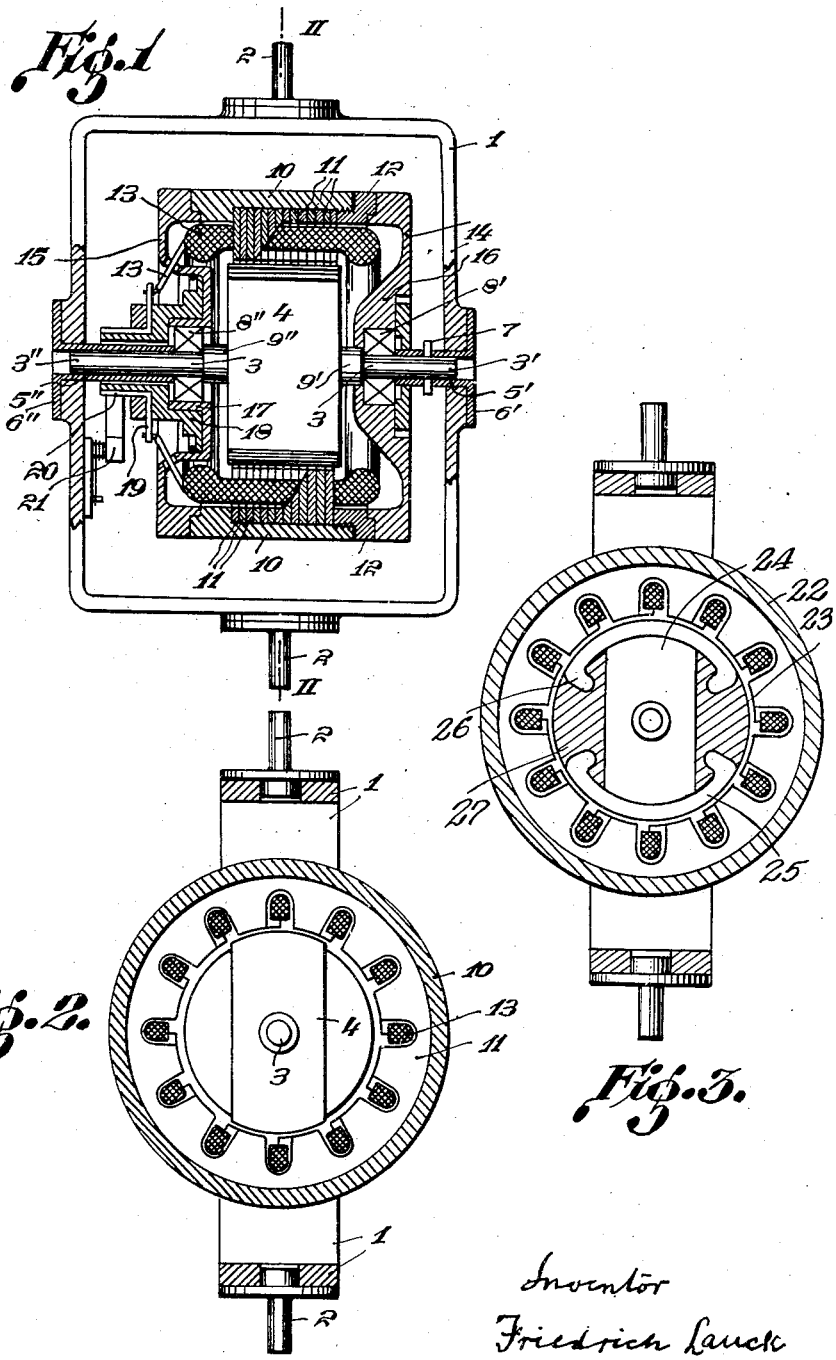

2,163,528

UNITED STATES PATENT OFFICE 2,163,528

DIRECT CURRENT MOTOR

Friedrich Lauck, Berlin-Spandau, Germany, assignor to Siemens Apparate und Maschinen Gesellschaft mit beschränkter Haftung, Berlin, Germany, a corporation of Germany Application March 16, 1937, Serial No. 131,267
In Germany March 16, 1936

6 Claims. (Cl. 172—36)

My invention relates to a gyroscope provided with a direct-current motor drive as is employed in airplane controls for gyroturn indicators. The object of my invention is to provide a gyroscope of a particularly advantageous construction as to mechanical, electrical and magnetical conditions as well. This may be accomplished according to the invention by providing as an axis of rotation, a shaft firmly secured to the frame and having a permanent magnet fixedly mounted thereon and carrying a rotor—revolving about the permanent magnet—as an armature and as a flywheel mass for the gyroscope.

Further details of my invention will be apparent from the following description taken in connection with the accompanying drawing, in which Fig. 1 shows a horizontal sectional view of a gyroscope, Fig. 2 is a vertical sectional view taken on the line II—II of Fig. 1, and Fig. 3 is a vertical sectional view of another embodiment of the invention.

In Figs. 1 and 2, the novel gyroscope is shown in connection with a turn indicator for airplane controls. The stirrup-shaped frame 1 constitutes the supporting ring for the gyroscope. This frame of rectangular form is firmly secured to the trunnions 2, 2 and is pivotally supported by the latter for rotation about an axis at right angles to the axis of rotation of the gyroscope and which forms the precession axis thereof. The bearings for trunnions 2—2, (not shown) are fixed relatively to the aircraft.

Axle 3 which is firmly secured to the frame 1 serves as an axis of rotation of the gyroscope. On axle 3 is fixedly mounted the permanent magnet 4 which forms in this case the stator of the direct-current motor. This rigid connection of the axle 3 with the frame 1 is established by the bushings 5', 5'', each provided with a circular flange 6', 6'' secured to corresponding counter-flanges of the frame 1 by means of screws. One axle end 3' is mounted in the bushing 5' and is firmly secured to the latter by means of a pin 7 passing therethrough, whereas the other end 3'' is slidably mounted in the bushing 5''.

On the axle 3 and at both sides of the stator 4 are arranged bearings 8' and 8'', for instance ball bearings which are pressed against collars 9', 9'' on axle 3 by means of the bushings 5', 5''. In this manner, both bearings are firmly held in position with resepct to the magnet and the frame and at the same time the magnet 4 is, therefore, in proper spaced relation to the frame 1.

The revolving part constitutes the rotor of the motor and at the same time the flywheel mass for the gyroscope. It consists substantially of a cylindrical central portion 10 which serves as a support for the armature laminations 11 which are shrunk into the central portion 10 without riveting the same. The laminations 11 are pressed together in the central portion 10 and held together by a threaded ring 12. They are provided with open slots, inclined at an angle to the cylinder generatrix, into which slots the armature winding 13 is placed.

The armature is closed at both ends by end plates 14 and 15 and forms in this manner a completely closed drum-like body. Both end plates consist of ferromagnetic material and the magnetic field present inside the armature is completely shielded thereby so that magnetic interference by the armature field with magnetic parts in the neighborhood of the turn indicator are excluded when the armature current is turned on.

The two end plates 14 and 15 are at the same time mechanically designed so that they serve as end shield bearing brackets for the rotor. The end shield bearing bracket 14 has a hub-shaped cross-section as indicated at 16 and the bearing 8' is snugly fitted into said hub. Since this bearing as already above mentioned is held in a fixed position on the axle 3, the end shield bearing bracket and, therefore, the rotor are thus properly positioned with respect to the frame and the permanent magnet.

On the other hand, the end shield bearing bracket 15 is provided with a tubular flange 17 which surrounds the bearing 8'' without undue clearance and so that there may be relative movement between this bearing and the end shield bearing bracket. Therefore, if, for instance, expansions due to heat should occur in the armature, this design permits a displacement of the tubular flange 17 in the axial direction on the bearing 8'' firmly secured to the ale 3. Since the tubular flange 17 may move in the axial direction binding due to heat is avoided and the rotor is nevertheless positioned without undue clearance.

The end shield bearing bracket 15 serves at the same time as a support for the commutator of the motor. On the tubular flange 17 is arranged a bushing 18 consisting of insulating material which is secured to the end shield bearing bracket 15. This bushing carries the commutator 19 with the commutator segments 20. The windings 13 are connected to these commutator segments and are fed through metal brushes 21 secured to the frame 1.

One bearing of the gyroscope is, as a rule, unshiftable on the axle, whereas the other bearing permits an axial displacement of the rotor at the side of the latter on which this bearing is mounted. Instead of designing this bearing as shown in Fig. 1, the bearing 8'' may be firmly secured to the end shield bearing bracket 15 and displaced on the axle in the axial direction so that also in this case binding due to heat expansion is avoided.

The electrical part of the direct-current motor employed as a gyroscope is so designed that the required high speed of the gyroscope is ensured. If such motors are driven at high speeds, considerable iron losses which impair the efficiency of the motor and produce undue heating thereof are caused in the permanent magnet, particularly owing to the slots of the rotor lying opposite thereto.

These drawbacks are avoided in the novel gyroscope by the fact that the surfaces of the permanent magnet opposite to the air gap are provided with laminated soft iron parts designed in the form of pole pieces and which are held firmly in position by filling bodies surrounding the pole pieces and which are formed by injection or by casting. In this case the main point is that the laminated soft iron parts designed in the form of pole pieces are not directly secured to the permanent magnet. It is, therefore, possible to design the laminated pole shoe parts in the direction of the magnetic flux with particularly small dimensions. The arrangement presents the further advantage that the machining of the permanent magnet which would, otherwise, be very complicated, is avoided.

An example of such an embodiment is shown in Fig. 3, wherein 22 denotes the slotted outer rotor of the motor serving as a flywheel mass for the gyroscope and carrying the armature winding connected to the commutator. In the bore 23 of the outer rotor is arranged the stator 24 which is formed substantially of the permanent magnet. 25 denotes the laminated soft iron parts whose segments lie side by side in the direction of the axis of rotation. The segments have inwardly projecting parts 26 which are embedded in the filling bodies 27 so as to hold these parts firmly in position. The filling bodies consist of cast-in or injected metal, of pressed material or the like. The filling bodies form cylinder sections which together with the permanent magnet and with the soft iron segments adjacent thereto form a solid cylinder. In this manner considerable hollow spaces are avoided inside the motor, whereby the windage is reduced to a minimum. The parts serving to support the magnet system may preferably be secured directly to the filling bodies 27.

The arrangement of such laminated soft iron parts with filling bodies need not be limited to gyroscopes designed in the form of direct-current motors, but it may also be applied to gyroscopes designed as alternating-current motors.

The magnet body is preferably manufactured as follows: The permanent magnet and the laminated soft iron parts are placed together in a mold, and the filling bodies are formed in the mold by injection or casting.

I claim as my invention:

1. An electrical gyroscope, comprising a frame, means mounting said frame for rotation thereof, a shaft mounted in said frame at right angles to said mounting means, means fastening said shaft to said frame at one end thereof, means mounted on said frame providing a sliding support for said shaft at the other end thereof, a permanent magnet fixedly mounted on said shaft, and a rotor mounted for rotation on said shaft, said rotor being so constructed as to serve as both an armature and a flywheel mass for said gyroscope.

2. An electrical gyroscope, comprising a frame, means mounting said frame for rotation thereof, a shaft fixedly mounted in said frame at right angles to said mounting means, a permanent magnet fixedly mounted on said shaft, a rotor comprising an open cylinder of a magnetic mass, two end plates comprised of ferromagnetic material sealing said ends, said rotor and end plates completely surrounding said magnet and magnetically shielding the same, and bearings fixedly mounted on said shaft, one of said end plates coacting with one of said bearings to hold said rotor in position, the other of said end plates providing a sliding support between said rotor and another of said bearings, whereby axial expansion of said rotor may ensue.

3. In a device of the character described, a frame, an axle fixedly mounted in said frame, a permanent magnet fixedly supported by said axle, a hollow rotor surrounding said magnet, means mounting said rotor for rotation about said axle, comprising an end plate supporting one end of said rotor and journaled on said axle whereby said rotor is fixed axially, a second end plate supporting the other end of said rotor, said plate comprising an open hub, a commutator mounted on the outside of said hub, and a bearing on said axle, the interior of said hub being mounted for sliding contact with said bearing, whereby axial expansion of said rotor may ensue.

4. In a device of the character described, a rotor, comprising a cylinder open at two ends thereof, means providing an abutment adjacent one end thereof, laminations shrunk into said cylinder and providing a rotatable magnetic mass, a threaded member coacting with one end of said cylinder and holding said laminations against said abutment whereby said laminations are fixed in place, a shaft fixedly mounted in position in the axis of said cylinder, a permanent magnet fixedly mounted on said shaft and within said rotor, and end plates closing the open ends of said rotor and mounted on said shaft, whereby said rotor is rotatively mounted thereon.

5. A gyroscope, comprising a frame, means mounting said frame for rotation thereof, two bushings mounted in said frame, an axle mounted in said bushings at the end thereof, a pin passing through one end of said axle and one of said bushings, the other end of said axle and the other bushing providing a sliding contact, a permanent magnet fixedly mounted on said axle, an open ended rotor surrouding said magnet, two end plates fastened to the ends of said rotor and mounted on said axle whereby said rotor is rotatively mounted thereon, means coacting with one of said end plates to hold said rotor in fixed axial position, and means providing a sliding fit between said axle and the other of said end plates.

6. In a device of the character described, a frame, an axle fixedly mounted in said frame, a permanent magnet fixedly mounted on said axle, a rotor comprising an open ended cylinder, laminations expanded into the interior of said cylinder and having slots formed crosswise, an electrical winding disposed in said slots, end plates closing the open ends of said rotor and mounted on said axle whereby said winding is rotatively mounted about said magnet, one of said end plates comprising a hollow hub, a commutator laminated to said winding and mounted on the exterior of said hub, and means coacting with the interior of said hub and providing a sliding surface whereby relative axial movement between said rotor and said axle is permitted.

FRIEDRICH LAUCK.